F. VEAL.
Grain Drill.
No. 24,419.
Patented June 14, 1859.
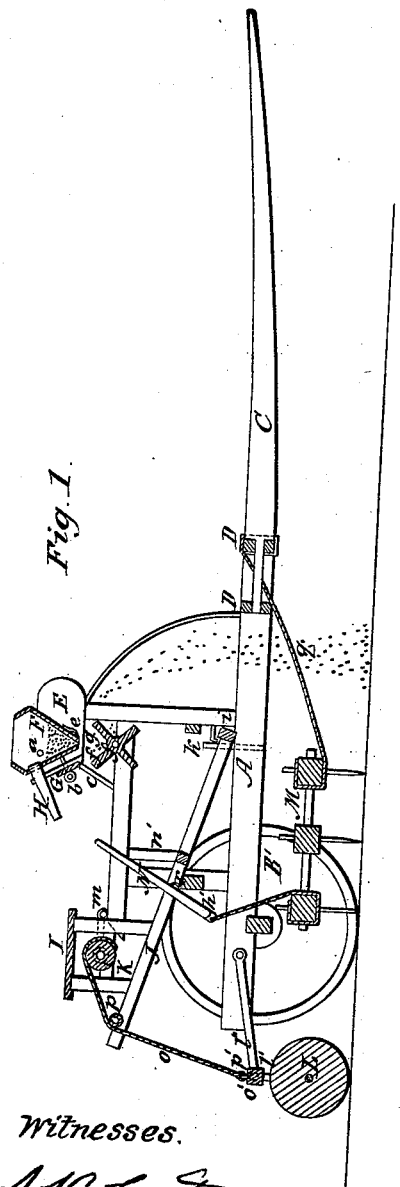
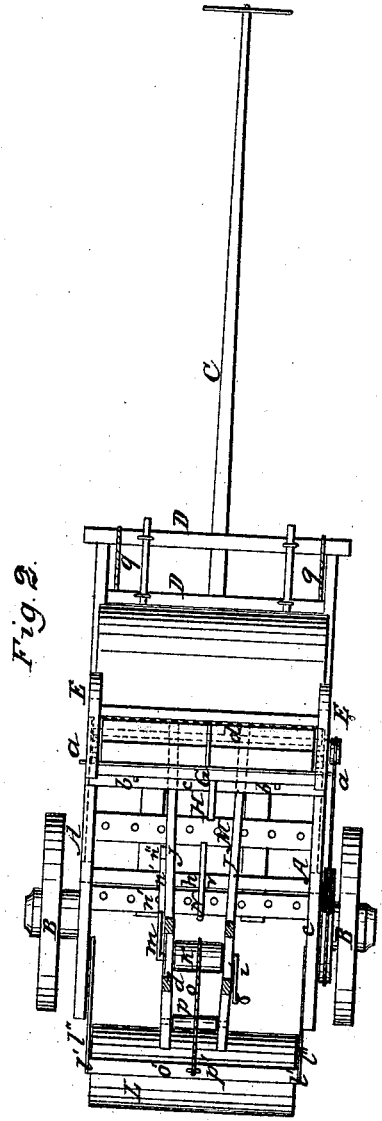
Witnesses.
Inventor.
Franklin Veal.

UNITED STATES PATENT OFFICE.

FRANKLIN VEAL, OF HALLETSVILLE, TEXAS.

IMPROVEMENT IN SEEDING-MACHINES.

Specification forming part of Letters Patent No. 24,419, dated June 14, 1859.

*To all whom it may concern:*

Be it known that I, FRANKLIN VEAL, of Halletsville, in the county of Lavaca and State of Texas, have invented a new and Improved Seeding-Machine; and I do hereby declare that the following is a full, clear, and exact description of the same, reference being had to the accompanying drawings, forming a part of this specification, in which—

Figure 1 represents a longitudinal vertical section of a seeding-machine constructed according to my invention. Fig. 2 is a plan or top view of the same.

Similar letters of reference in both views indicate corresponding parts.

This invention consists in arranging the hopper-box and a harrow and a smoothing-roller in such a manner that all of them, or each for itself, can be operated from the driver's seat, the hopper-box being hinged and provided with a lever, whereby the box can be brought in such a position that the flap board or valve is not opened by the cam, or that the same is opened for the purpose of discharging seed, and the harrow is suspended from a rope or chain in such a manner that the same can be lifted clear from the ground by means of a hand-lever which can be reached from the driver's seat, and the smoothing-roller is attached to the frame in such a manner that it can be raised from or lowered to the ground by means of a windlass which is operated by a handle from the driver's seat.

To enable those skilled in the art to make and use my seeding-machine, I will proceed to describe its construction and operation.

A is a frame, constructed in the usual rectangular form given to frames of similar machines, and it is supported by wheels B B' and drawn along by the draft-pole C, which is secured in the cross-bars D, as clearly represented in Fig. 1. Supported by this frame, and secured to short arms E by means of pivots $a$, is the hopper-box F, and the position of these pivots is such that the box bears against the set-screws $b$, which are screwed into the cross-bar G, to which a narrow protecting-board, $c$, is secured, and the seed is discharged by a flap board or valve, $d$, which is kept closed by springs $e$, and which is operated by a cam, $f$, striking against the noses $g$, which are secured one to each side of the flap-board $d$. The amount of throw given to the flap-board is regulated by the set-screws $b$, by means of which the hopper-box can be vibrated on the pivots $a$, so that the noses $g$ approach to or remove from the center around which the cam $f$ moves, so that the flap-board opens more or less. The cam $f$ is attached to a fan-like wheel, $f'$, which is rotated from a pulley, $e'$, on the axle of the driving-wheel B, and which serves to distribute the seed. A hand-lever, H, is secured to the upper edge of the hopper-box, and in such a position that by means of the same the hopper-box can be turned on its pivots from the set-screws $b$, and far enough so as to bring the noses $g$ out of reach from the cam $f$ and to stop the discharge of seed altogether. This lever can be operated from the driver's seat I, which is supported by a separate framing resting on the two beams J, which rest on the cross-bar $h$ of the frame A, and which are united at their lower end by a bar, $i$, which is confined in its position by pins $k$, so that the beams J can be raised from or lowered to the bar $h$, whereby the height of the seat from the ground can be changed at pleasure.

Situated under the driver's seat is a windlass, K, which has its bearings in the framing which supports the seat, and which is turned by means of a crank, $l$, and a stop, $m$, is secured to the axle of the windlass, which, by striking against a lever, $n$, prevents the windlass from turning spontaneously, and the lever $n$ turns on a pivot, $n'$, in the side of one of the beams J, and it is operated by a foot-lever, $n''$, which can be reached from the driver's seat. This windlass serves to raise a smoothing-roller, L, by means of a rope or chain, $o$, which is secured to a cross-bar, $o'$, of the framing $l'$, which serves as a bearing for the axle of the roller, L, and which is secured to the frame A by means of pivoted arms $l''$. The rope $o$ extends from the windlass over a roller, $p$, which has its bearings in the ends of the beams J, to a loop or eye, $p'$, which is secured to the middle of the cross-bar, $o'$, so that by turning the windlass the smoothing-roller is raised, and if the lever $n$ is now turned up so as to arrest the stop $m$ on the axle of the windlass the smoothing-roller is kept suspended from the rope $o$.

Secured to one of the front cross-bars, D, of the frame A by means of ropes or chains $g$ is the harrow M, and a lever, N, serves to raise the harrow from the ground. This lever has its fulcrum on a pivot, $r$, which is firmly secured to the cross-bar $h$, and in such a position that the lever N can be reached conveniently from the driver's seat I.

The operation is as follows: When the machine is to be drawn from place to place the discharge of the seed is stopped by the hand-lever H, and the smoothing-roller L, as well as the harrow M, is raised from the ground, the former by the windlass K and the latter by the lever N, and after the machine has arrived in the proper place the hopper, the harrow, and the smoothing-roller are let down and the work begins. The ground is first plowed, and the seeding-machine is drawn over the field crosswise to the furrows, and as the seed is spread by the wheel $f'$ it is worked down into the ground by the harrow, and the ground is pressed and leveled by the smoothing-roller.

What I claim as new, and desire to secure by Letters Patent, is—

1. The arrangement of the windlass K, the hand-lever H, and the lever N, in combination with the smoothing-roller L, the hopper F, and the harrow M, and in such relation to the driver's seat I that they can be operated from the same, substantially as and for the purpose specified.

2. The combination of the fan-cylinder $f f'$ with the hopper, substantially as and for the purpose described.

FRANKLIN VEAL.

Witnesses:
 A. K. FOSTER,
 T. A. HESTER.